United States Patent [19]
Zaragoza et al.

[11] Patent Number: 5,133,606
[45] Date of Patent: * Jul. 28, 1992

[54] ELECTRONIC CLINICAL THERMOMETER

[75] Inventors: Robert Zaragoza, New York, N.Y.; Thomas V. McLinden, Oxford, Conn.; James A. O'Connell, Short Hills, N.J.

[73] Assignee: Becton, Dickinson and Company, Franklin Lakes, N.J.

[ * ] Notice: The portion of the term of this patent subsequent to May 7, 2008 has been disclaimed.

[21] Appl. No.: 674,814

[22] Filed: Apr. 15, 1991

Related U.S. Application Data

[63] Continuation of Ser. No. 387,457, Jul. 28, 1989, Pat. No. 5,013,161.

[51] Int. Cl.⁵ ............................ G01K 1/00; G01K 7/00
[52] U.S. Cl. ...................................... 374/208; 374/170; 374/183
[58] Field of Search ............... 374/208, 209, 158, 163, 374/170, 183, 190–194

[56] References Cited

U.S. PATENT DOCUMENTS

| | | | |
|---|---|---|---|
| D. 254,189 | 2/1980 | Prosky | D10/57 |
| D. 254,779 | 4/1980 | Sulek et al. | D10/57 |
| 2,797,682 | 7/1957 | Kannenberg | D10/57 |
| 3,221,555 | 12/1965 | Biber | 73/362 |
| 3,946,612 | 3/1976 | Sagi et al. | 374/160 |
| 3,946,613 | 3/1976 | Silver | 374/208 |
| 4,072,054 | 2/1978 | Blouin et al. | 73/343 |
| 4,159,766 | 7/1979 | Kluge | 374/209 |
| 4,166,389 | 9/1979 | Montren | 374/158 |
| 4,317,367 | 3/1982 | Schonberger | 374/165 |
| 4,341,992 | 7/1982 | Goldstein | 374/158 |
| 4,538,927 | 9/1985 | Jochemczyk et al. | 374/163 |
| 4,658,949 | 8/1987 | Hatakenaka | 374/208 |
| 4,729,672 | 3/1988 | Takagi | 374/208 |
| 4,743,121 | 5/1988 | Takagi et al. | 374/163 |
| 4,813,790 | 3/1989 | Frankel et al. | 374/208 |

Primary Examiner—William A. Cuchlinski, Jr.
Assistant Examiner—Alvin Wirthlin
Attorney, Agent, or Firm—John L. Voellmicke

[57] ABSTRACT

A thermometer for measuring the temperature of a living being comprises a housing having a hollow probe extending outwardly therefrom in a distal direction and a temperature sensing element located at the distal end of the probe. The housing holds a digital display and electrical means in electrical communication with the temperature sensing element for converting the temperature measured by the temperature sensing element into a readout on the display element. A resilient soft cover covers the probe and a portion of the housing to form a gripping surface for the user while allowing visualization of the display element. The resilient cover is softer than the probe.

24 Claims, 5 Drawing Sheets

ELECTRONIC CLINICAL THERMOMETER

This is a continuation of application Ser. No. 387,457, filed Jul. 28, 1989, now U.S. Pat. NO. 5,013,161.

BACKGROUND OF THE INVENTION

1. Field of the Invention

The present invention relates to thermometers and more particularly concerns electronic clinical thermometers.

2. Description of Related Information

Clinical thermometers are used primarily to measure the temperature of a living being. Temperature measurements taken orally, axillary or rectally are generally accepted as having relevance to the core temperature of the being.

Glass thermometers have been used in this fashion for many years. Glass thermometers usually include a hollow bulb containing mercury which is attached to a glass stem having a small diameter capillary extending along its length and a numerical scale. In use, as the body heat warms the mercury, the mercury expands forcing itself along the capillary. The distance the mercury travels along the capillary is related to the temperature being measured and the scale is calibrated so that the temperature is that point on the scale which is coincident with the leading edge of the mercury column in the capillary. Glass thermometers are low in cost and accurate. They are also subject to breakage, difficult for some people to read, and some users find this cold rigid shaft shaped glass instrument uncomfortable.

Attempts have been made to make the traditional glass thermometer more user friendly. For example, Blouin et al., in U.S. Pat. No. 4,072,054 teach a device consisting of a combination of a pacifier nipple structure and glass thermometer device to minimize breakage and make the temperature taking instrument more friendly to the patient which in this case would be an infant. Also, U.S. Pat. No. 2,797,682 to Kannenberg teaches a thermometer mouthpiece consisting of a flat block made of rubber, plastic or other suitable material. Kannenberg's mouthpiece includes an opening which is angularly positioned with respect to the mouthpiece for containing the known glass clinical thermometer. One of the objectives of Kannenberg's mouthpiece is to prevent biting and breaking of the thermometer. However, the temperature measurement probe in Kannenberg is still a rigid hard glass thermometer.

Sometime around the 1960's electronic thermometers began appearing in the marketplace. These thermometers usually contained a probe, a relatively large control box containing the electronics, and a wire conduit connecting the probe to the control box. The bulky mechanism and circuits, and the need for adequate electrical power made the control box a necessary separate element. U.S. Pat. No. 3,221,555 to Biber teaches a control box type thermometer. These thermometers although different from the traditional glass clinical thermometer still made little attempt for use friendliness. The probe in Biber's thermometer is made of coaxial cable with an apparently thin coating of silicone rubber.

Sometime later self contained electronic clinical thermometers appeared in the marketplace. These thermometers are a rigid assembly of a body or handle portion with a probe extending therefrom and usually include a digital display for informing the user of the temperature being measured and an on/off switch to preserve the power supply while the thermometer is not in use and/or to activate the power supply. Such thermometers are illustrated in U.S. Pat. No. Des. 254,779 to Sulek et al. and U.S. Pat. No. Des. 254,189 to Prosky.

Numerous patents teach detail improvements to the self-contained electronic clinical thermometers such as U.S. Pat. No. 4,729,672 to Takagi which teaches a structure for helping to prevent liquids from entering the interior of the thermometer. Also, U.S. Pat. No. 4,743,121 to Takagi et al. teaches a clinical thermometer case which is manufactured using multi color injection molding of a transparent window and an opaque body surrounding the window to apparently prevent liquids from entering the thermometer through the interface of the window with the case. However, little attempt has been made to improve the user friendliness of self-contained electronic thermometers which are also made of rigid hard plastic which is cold and user unfriendly.

Although the art teaches many variations of the traditional glass clinical thermometer and electronic clinical thermometers there is still a need for a simple, straightforward, reliable, easily fabricated electronic clinical thermometer having improved user friendliness both from the standpoint of the person whose temperature is being taken and the person who is taking the temperature, and for an electronic clinical thermometer which is also more resistant to the traumas of temperature taking, such as biting and rough usage including submersion in liquid or shocks experienced by dropping the thermometer.

SUMMARY OF THE INVENTION

The thermometer of the present invention comprises a housing having a hollow probe extending outwardly therefrom in a distal direction and a temperature sensor means located at the distal end of the probe. The housing holds a visual temperature display and electrical means in electrical communication with the temperature sensing means for converting temperature measured by the temperature sensing means into a readout on the display. A resilient soft cover covers the probe and a portion of the housing to form a gripping surface for the user while allowing visualization of the display. The resilient cover is softer than the probe.

In another embodiment of the present invention a thermometer for measuring the temperature of a living being comprises a rigid housing having a hollow probe extending outwardly therefrom in a distal direction and a temperature sensing element located at the distal end of the probe. The housing holds a digital display and electrical means for converting the temperature measured by the temperature sensing element into a digital readout on the digital display. The electrical means is adapted to engage a battery to facilitate operation of the thermometer. Conductor means provide for electrical communication between the electrical means and the temperature sensing element. A manually operatinq switch is provided for manually activatinq the electrical means for temperature measurement and for deactivating the electrical means to preserve the battery while the thermometer is not being used. A soft resilient cover covers the probe and a portion of the housing to form a gripping surface for the user while allowing visualization of the digital display. The resilient cover is softer than the probe and surrounds the housing in at least one plane. The probe is more flexible in response to bending forces than the housing wherein the probe is capable of maintaining its shape while the thermometer is being held by its gripping surface and capable of deflecting in response to forces experienced during temperature measurement such as oral temperature measurement.

DETAILED DESCRIPTION

Figure 1:
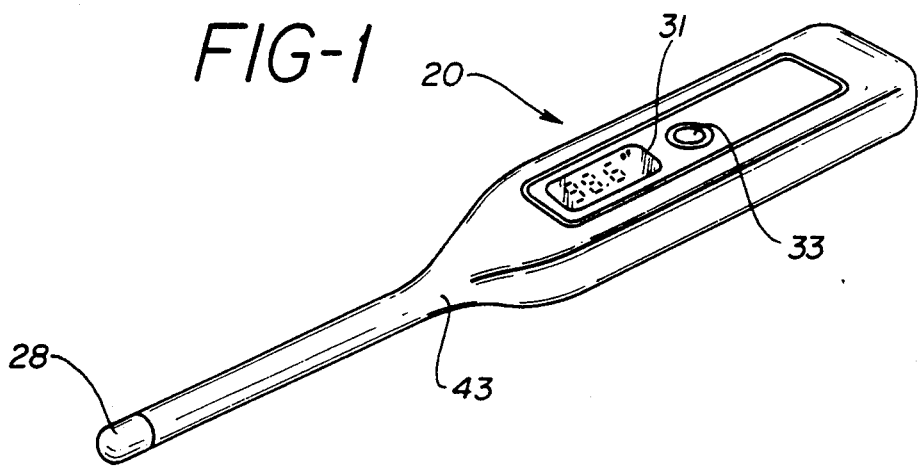
FIG. 1 is a perspective view of the preferred embodiment of the electronic clinical thermometer of the present invention.
Figure 2:
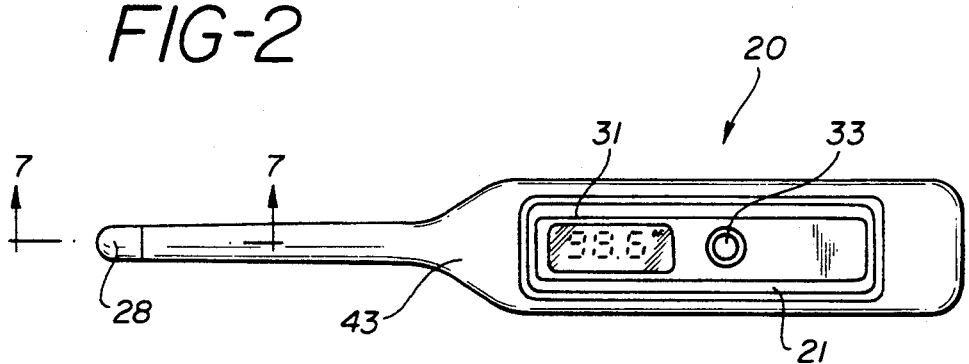
FIG. 2 is a top plan view of the electronic clinical thermometer of FIG. 1.
Figure 3:
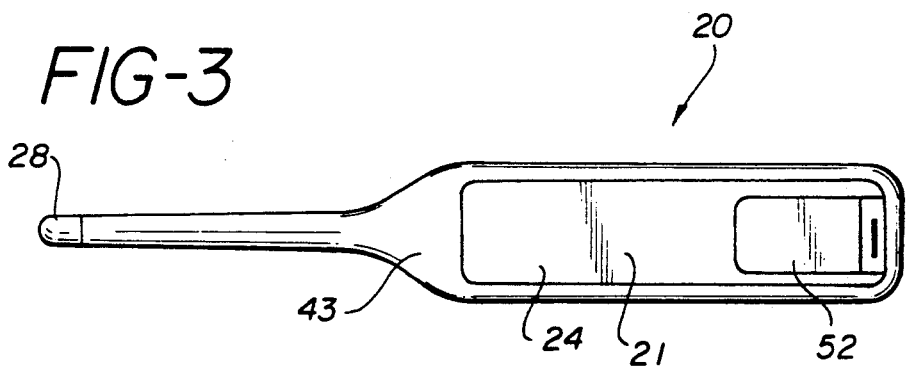
FIG. 3 is a bottom plan view of the electronic clinical thermometer of FIG. 1.
Figure 4:
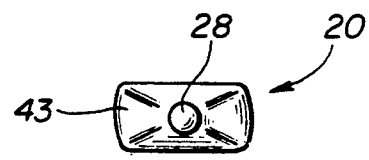
FIG. 4 is a side elevation view of the electronic clinical thermometer of FIG. 1 as viewed from the end of the thermometer containing the temperature sensing element.
Figure 5:
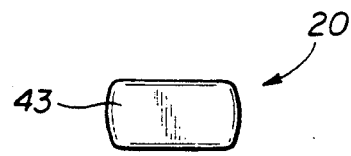
FIG. 5 is a side elevation view of the electronic clinical thermometer of FIG. 1 taken from the end of the thermometer opposite the end containing the temperature sensing element.
Figure 6:
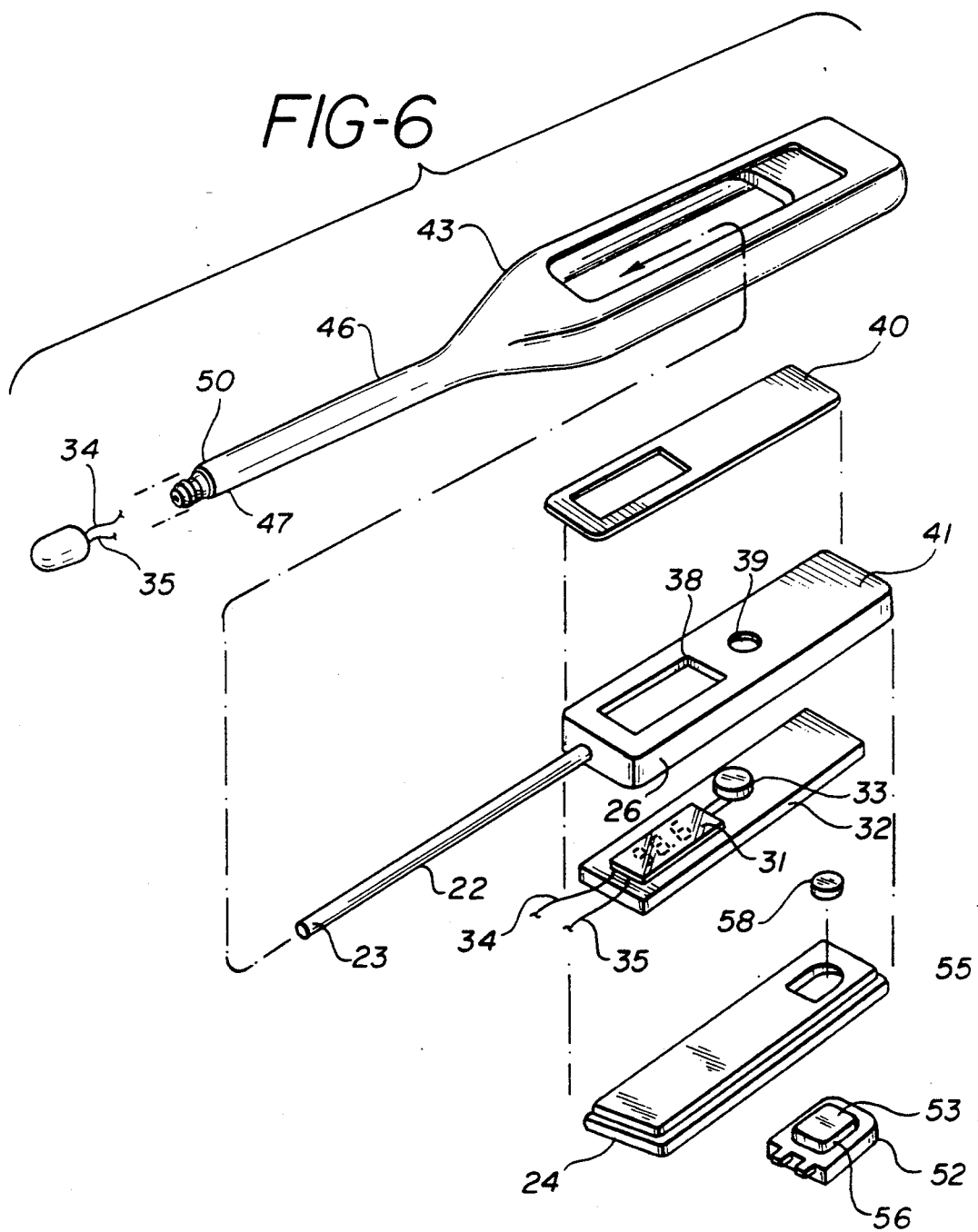
FIG. 6 is an exploded view showing the assembly of the thermometer of FIG. 1.

While this invention is satisfied by embodiments in many different forms, there is shown in the drawings and will herein be described in detail a preferred embodiment of the invention with the understanding that the present disclosure is to be considered exemplary of the principles of the invention and is not intended to limit the scope of the invention to the embodiment illustrated. The scope of the invention will be measured by the appended claims and their equivalents.

Adverting to FIGS. 1-7, an electronic clinical thermometer 20 for measuring the temperature of a living being comprises a rigid housing 21 having a hollow probe 22 extending outwardly from the rigid housing in a distal direction. The probe is preferably more flexible in response to bending forces than the rigid housing. Temperature sensing means is located at distal end 23 of the hollow probe. In this preferred embodiment temperature sensing means includes temperature sensing element 25 having a thermistor 27, within a metallic bulb 28. The thermistor is positioned in the metallic bulb by an adhesive.

For the purposes of the description of the present invention the term "distal end" is meant to refer to the end of the thermometer closest to the temperature sensing element, whereas the term "proximal end" is meant to refer to the end of the thermometer being held by the user's hand or the end of the thermometer which is furthest from the temperature sensing element.

The housing holds a digital display 31 and electrical means in the form of a circuit board 32 including the necessary electrical elements for converting the temperature measured by the temperature sensing element into a digital readout on digital display 31. For manufacturing convenience the circuit board also includes means for accepting a battery 58 and a manually operable switch 33 for activating the circuitry by allowing current from the battery to pass thereto and for deactivating the circuitry to preserve the battery while the thermometer is not being used. The preferred switch is a push button membrane type which is open and shut by successive applications of digital pressure in a direction which is perpendicular to the surface of the thermometer. The circuit board in its preferred embodiment also includes means to produce an audible sound (not shown) to alert the user that the determination of the temperature being measured is complete and is displayed in the digital display. The circuit board in this embodiment also includes automatic shut off means for automatically deactivating the circuitry to preserve the battery if a temperature is not measured for a specific amount of time, for example, ten minutes.

It should be noted that numerous patents teach circuits suitable for electronic clinical thermometers and the circuit components are readily available commercially. Also, electrical components such as the digital display, means to produce an audible sound, and the manually operable switch are available commercially, and the circuit board can easily be designed to accommodate the conditions of use for the thermometer. Although a liquid crystal digital display is preferred because of its low power requirement and ease of reading, the display may be analog and need not be liquid crystal. There are many possibilities for the electronic components of the electronic clinical thermometer of the present invention and the arrangement described herein is exemplary of these many possibilities.

Thermistor 27 of temperature sensing element 25 is connected to the components of circuit board 32 by wires 34 and 35. Although wires are illustrated in this preferred embodiment it is possible to utilize other forms of conductive materials such as providing a hollow probe made of conductive material or having conductive elements embedded in or printed on the surface of the probe. Again, the wires 34 and 35 are representative of the many conductor means which could be used to provide electrical communication between thermistor 27 and the electrical components of the circuit board.

In this preferred embodiment the rigid housing and the hollow probe are both made of thermoplastic materials and are joined together by a suitable means such as ultrasonic welding, epoxy adhesive, solvent based adhesive, heat sealing or the like to produce a preferably water-tight interface between the hollow probe and the rigid housing. The housing and the probe may be integrally formed into a one piece structure. Circuit board 32 with digital display and manually operable switch 33 and battery 58 are firmly held and contained within the housing with wires 34 and 35 projecting into the hollow probe. A lower housing element 24 is part of housing 21 and is attached to upper housing element 26 by any suitable means such as used to attach hollow probe 22 to rigid housing 21 for the purpose of preferably providing a water tight seal.

It is preferred that the entire housing be water tight to prevent entry of liquid into the housing in order to protect the elements attached to the circuit board and the circuit board. There are numerous ways to prevent liquid from entering the housing between digital display 31 and digital display aperture 38 in the housing and between manually operated switch 33 and switch aperture 39 in housing 21 such as the use of elastomeric O-rings, resilient sealants or gaskets and the like. In this preferred embodiment the upper portion of the housing is rendered water tight by attaching resilient plastic membrane 40 to the housing around the periphery of upper wall 41 in the housing so that water may not enter the housing through digital display aperture 38 or switch aperture 39. Also, because switch 33 is manually operable by digital pressure which is applied in a direction perpendicular to upper wall 41, the switch may be operated through the membrane by applying pressure on the membrane which is transferred through the membrane to the switch thus providing a water resistant assembly while still allowing convenient operation of a mechanical switch.

Figure 7:
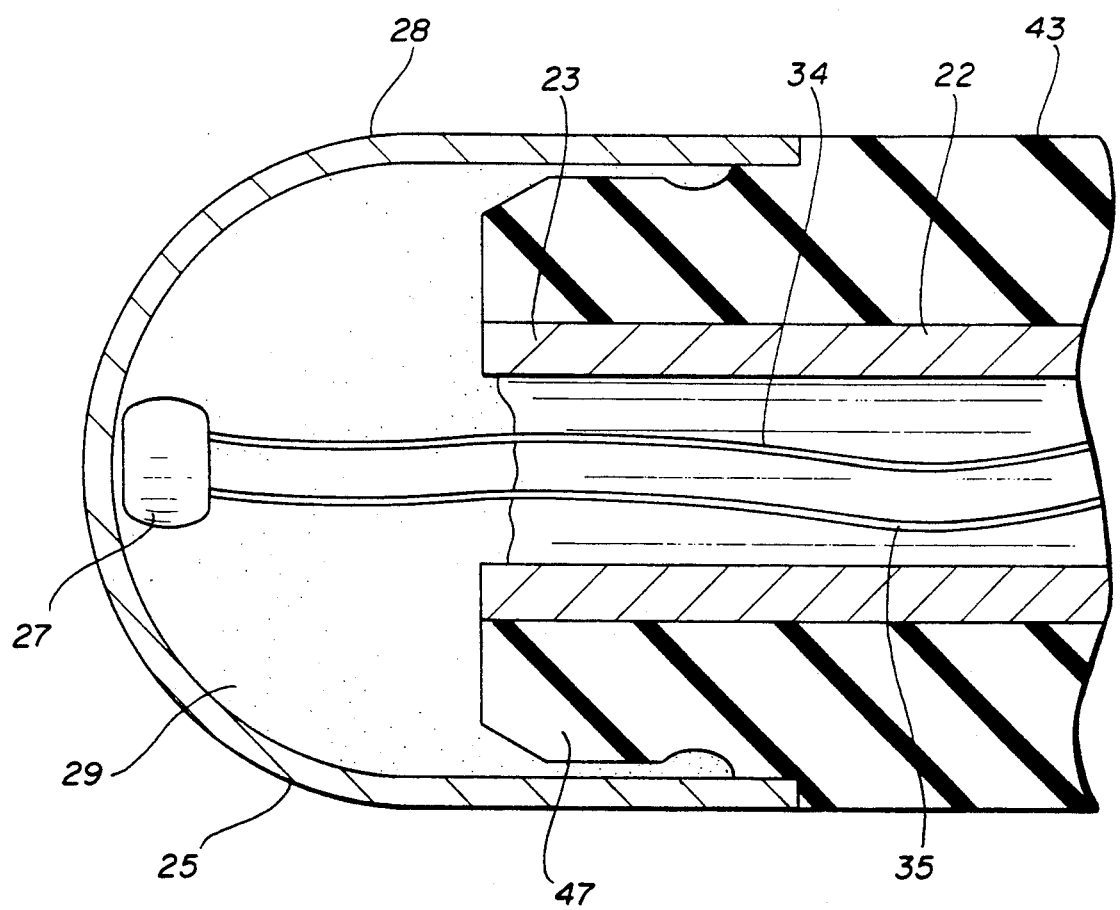
FIG. 7 is an enlarged partial cross-sectional view of the thermometer of FIG. 2 taken along line 7—7.
Figure 8:
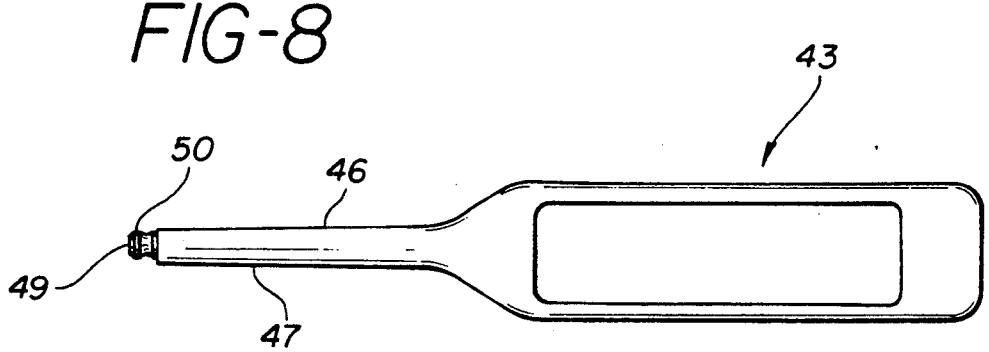
FIG. 8 is a top plan view of the soft resilient cover for the electronic thermometer of FIG. 1.
Figure 9:
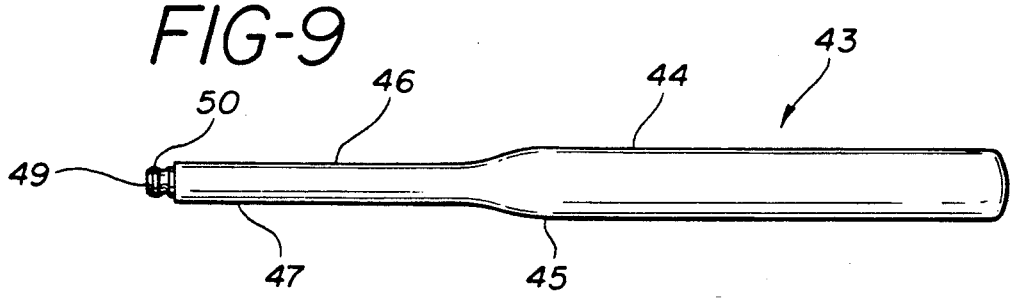
FIG. 9 is a side elevation view of the soft resilient cover of FIG. 8.
Figure 10:
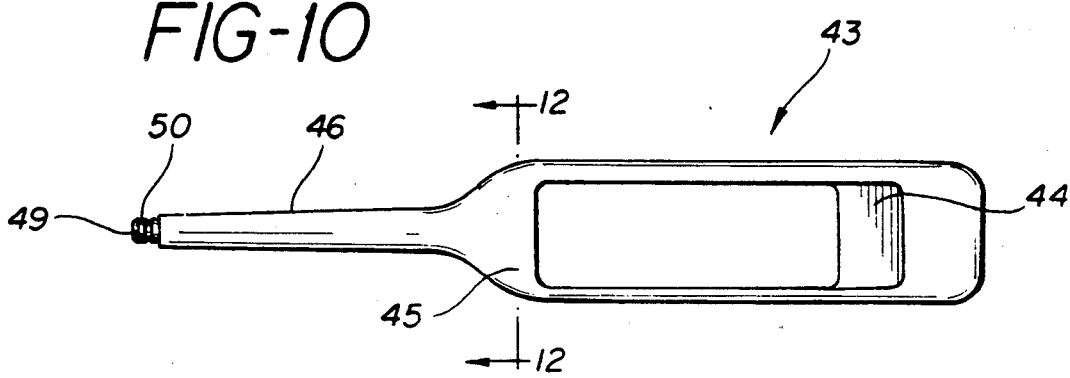
FIG. 10 is a bottom plan view of the soft resilient cover of FIG. 8.
Figure 11:
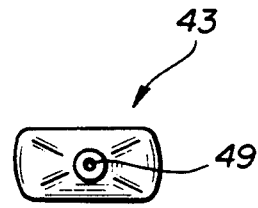
FIG. 11 is a side elevation view taken from distal end of the soft resilient cover of FIG. 8.
Figure 12:
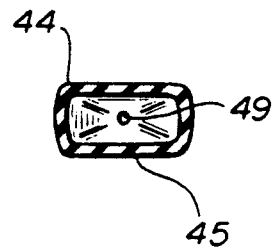
FIG. 12 is a cross sectional view of the soft resilient cover of FIG. 10 taken along lines 12—12.

Referring now to FIGS. 8 12 in addition to FIGS. 1-7, a soft resilient cover 43 covers probe 22 and a portion of housing 21 to form a gripping surface for the user's hand while allowing visualization of digital display 31. Soft resilient cover 43 includes top wall 44, bottom wall 45, probe covering portion 46 having a passageway 49 therethrough and an annular groove 50 at distal end 47 of the probe covering portion of the cover. The resilient cover means is softer than the probe and in this preferred embodiment is soft enough to allow assembly of the probe and housing into a unified structure and insertion of this unified assembly into the housing into the cover by flexing the resilient cover until the housing and probe are properly inserted in the resilient cover. Cover 43 desirably surrounds the housing in at least one plane. In the preferred embodiment, the resilient cover surrounds the housing in two planes: a plane substantially parallel to upper wall 41 of the housing; and also in a plane perpendicular to upper wall 41 in the area where the housing and the probe are joined.

Also included in this preferred embodiment is battery cover 52 including a raised boss 53 having recessed groove (not shown) around its periphery. A lower housing element aperture 55 is shaped similarly to raise boss 53. Battery cover 52 and/or lower housing element aperture 55 should preferably contain a sealing means which will render the interface between the battery cover and the lower housing element aperture resistant to the transfer of water from the exterior of the housing. In this preferred embodiment an O-ring seal 56 is retained by the groove in raised boss 53 and has resulting peripheral dimensions slightly larger than lower housing element aperture 55 so that when the battery cover is pressed into lower housing aperture 55 in a first closed position it forms a water tight seal resistant to water transfer from the exterior of the housing during normal use and cleaning of the thermometer. When the battery cover is disengaged from the lower housing portion in a second open position it allows access to a battery which engages the electrical means. The preferred embodiment of the present invention also contains locking means (now shown) so that when the battery cover is in the first closed position it is mechanically restrained from opening by a latch mechanism which is prefer ably molded into the battery cover or housing and which cannot be disengaged without the use of a small tool or coin. It will be apparent to one skilled in the art that there are numerous structures which are capable of functioning as a water-tight battery access means including threaded plugs, hinged covers using integrally molded living hinges and the like, and that the structure described herein is merely representative of these many possible structures for providing water-tight battery access means. It is also within the purview of the present invention to provide an electrical clinical thermometer without battery access means for thermometers that may be disposed of at the end of the useful life of the battery or disassembled to install the battery, and also to include battery access means which is not water tight. However, the water-tight battery access means is preferred.

In the preferred embodiment battery 58 may be installed at the time of assembly, or by the user at the time of initial use or replacement. A battery may also be permanently connected to the circuit board in thermometers which do not include battery replacement features.

Cover 43 is made of soft, resilient elastomeric material so that it is very flexible and can be placed around the other rigid thermometer components at various stages throughout the thermometer assembly process. For example, the housing can be permanently attached to hollow probe 22 with the circuit board 32, digital display 31 and manually operable switch 33 being installed in upper housing portion 26 which is then sealed by lower housing element 24 and resilient plastic membrane 40. A metallic bulb can then be adhesively bonded to the distal end of the hollow probe with a thermistor extending outwardly therefrom. This assembly can then be inserted into soft resilient cover 43 and contained therein via the use of adhesives around the interior surface of the cover and/or the exterior surface of the housing probe assembly. Also, a metallic bulb 28 can be secured in a water tight fashion after resilient cover 43 is in place over the hollow probe and the thermistor 15 is properly positioned, as best illustrated in FIG. 7. In this case, an epoxy resin 29 preferably having relatively good heat transfer properties while being a relatively poor electrical conductor is used to permanently seal the distal end 23 of the hollow probe and distal end 47 of resilient cover 43 to thermistor 27 and metallic bulb 28.

Figure 13:
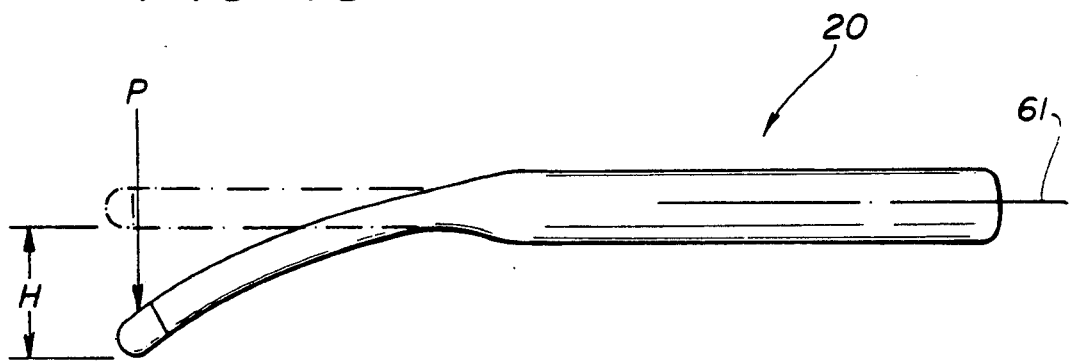
FIG. 13 is a side elevation view of the electronic clinical thermometer of FIG. 1 with force P applied to illustrate the flexible distal end of the thermometer.

Referring now to FIG. 13, along with FIGS. 1-12, a key feature of the preferred embodiment is a flexible probe which allows the distal end of the thermometer to flex while, for example, it is in the patient's mouth. The access to the point, where the temperature is being measured, from the bodily opening may not be a straight line as required by rigid prior art mercury/glass and electronic thermometers. Even if straight line access is available it may not be very comfortable for the patient. Also, in rectal, axillary, and oral temperature measurement, abrupt bodily movement by the patient may cause minor injury or trauma while using a rigid hard temperature measuring instrument. To overcome this deficiency in the prior art clinical thermometers the preferred embodiment of the present invention includes a flexible probe which provides more comfortable patient usage by allowing the probe of the thermometer to deflect or flex to conform to the patient's anatomy.

Along with the function of protecting the wires between the thermistor and the circuit board and being part of a water tight envelope, the probe can be structured using various materials and geometries to achieve a desirable degree of flexibility for improved patient comfort and to overcome the shortcomings of the prior art thermometers recited hereinabove. The probe should be more flexible in response to bending forces than the housing wherein said probe is capable of maintaining its shape while the thermometer is being held by the gripping surface and capable of deflecting in response to forces experienced during temperature measurement, such as oral temperature measurement.

As best illustrated in FIG. 13, the flexibility of the probe and cover of the thermometer of the preferred embodiment are constructed so that the application of a force P having a magnitude of 22 grams perpendicular to longitudinal axis 61 of the thermometer at the distal end of the probe will cause the distal end of the probe portion of the thermometer to deflect a distance H in the general direction of the force. H is desirably within the range of about 1 mm to 25 mm. Because the probe and cover act as a cantilever extending from the housing, known engineering techniques can be used to design a probe portion of the thermometer having a desired flexibility while using desirable materials.

The ability of the probe portion of the thermometer of the instant invention to deflect while within a patient's bodily cavity, such as the oral cavity, along with the soft resilient cover are believed to provide a significant improvement in user comfort, user friendliness and the avoidance of injury or trauma with respect to rigid hard prior art temperature measuring instruments.

The electronic clinical thermometer of the present invention has substantial functional and structural advantages over prior art thermometers. When compared to existing thermometers having rigid plastic probes and rigid plastic handles the instant invention having the resilient cover surrounding its probe and a portion of its housing the instant invention provides a substantially more comfortable feel to the user in oral temperature taking as compared to glass or rigid plastic thermometers. The resilient covered probe is easier for the user to retain in his or her mouth and it is more of the consistency of human flesh of the mouth than the cold hard glass or plastic. The hollow probe of the instant invention is made of harder material than the cover to resist inadvertent biting by the patient and to protect the electrical components while still offering a soft, friendly to the touch, probe.

Also, the portions of the resilient cover surrounding the housing which act as a handle are softer and easier to grip and more user friendly. The soft exterior structure can be achieved because the hollow probe and housing act as a frame or chassis which provides structural integrity and is substantially waterproof while the cover may be made of materials which are formulated primarily for user comfort. The present invention facilitates comfortable use and helps obtain more accurate temperatures than in a situation where the patient constantly moves the thermometer probe because of its foreign uncomfortable feel.

The soft resilient cover also has a higher coefficient of friction and will be less prone to sliding off work surfaces and even if it does fall or experience shock the possibility of damage is substantially reduced by the resilient outer cover.

The larger diameter of the resilient cover in the area of the hollow probe in the preferred embodiment is also believed to be more comfortable. In this preferred embodiment the portion of resilient cover 43 covering the hollow probe has an outside diameter of about 0.180 inches (4.6 mm) and an inside diameter of about 0.080 inches (2.0 mm). It is preferable that at least one portion of the resilient cover covering the probe have a circularly-shaped cross-section preferably having a diameter within the range of 4 mm to 5 mm. The hollow probe 22 has an outside diameter of approximately 0.080 inches (2.0 mm). Some commercially available digital thermometers have a rigid plastic probe having a diameter of about 0.12 inches (3 mm). The larger probe diameter having a relatively thick resilient user friendly cover is believed to be a key advantage of the instant invention over prior art thermometers. In the preferred embodiment over 80% of the cross sectional area of the portion of the cover covering the probe consist of resilient cover material with 50% to 90% being preferred. The softer probe is easier to grip and position by the patient using his or her mouth because it is softer and also because of the larger size which gives it improved leverage or mechanical advantage to control the portion of the thermometer outside of the patient's mouth. Also, the easier control helps assure that the temperature sensing element will be retained in one position throughout the temperature measurement procedure and not be moved around to distort the results to possibly negatively influence the resulting temperature measurement.

In use the electronic clinical thermometer of the instant invention is activated by depressing the manually operable switch. It is then placed in a suitable position with respect to the patient such as in the patient's mouth. After the circuit logic establishes that the temperature determination process has been completed, the means to produce an audible sound will signal the user telling the user to remove the thermometer for reading of the temperature. After reading and recording the temperature the manually operable switch may be depressed to deactivate the thermometer until the next use. The thermometer may be cleaned at this time. If using the thermometer with multiple patients, or in single patient use where cleaning of the thermometer is not practical, it may be desirable to use the thermometer of the instant invention in conjunction with disposable probe covers that are well known and commercially available.

A wide variety of flexible resilient materials are suitable for the resilient cover such as materials selected from the group of natural rubber, synthetic rubber, thermoplastic elastomer, thermoplastics, natural rubber latex, synthetic rubber latex, mixtures of natural rubber latex and synthetic rubber latex, and thermosets such as resilient foam. Thermoplastics such as polyvinyl chloride are preferred. In the preferred embodiment the soft resilient cover is made of polyvinyl chloride having: a hardness of approximately 50 Shore A durometer; a specific gravity of about 1.2; a tensile strength of about 1075 pounds per square inch; and an ultimate elongation of about 420 percent.

A wide variety of rigid materials are suitable for the rigid housing which in the preferred embodiment includes both upper and lower housing elements and the hollow, preferably flexible, probe. These materials include metals and plastics with no limitation that all of the elements be made of the same material. For example, the hollow probe may be made of plastic and the housing made of metal, such as a casting. Stainless steel and other corrosion resistant metals or alloys are preferred metals. With respect to non metals, injection molded polymers such as polystyrene, polyethylene, polypropylene and ABS are desirable with polyvinyl chloride being preferred. If a battery cover is included the same materials are generally desirable.

In the preferred embodiment both the rigid housing and the hollow probe are made of rigid polyvinyl chloride. The rigid housing elements and the hollow probe may be formed of one piece or separately and joined together using epoxy adhesives or solvent based adhesives, mechanical joining means, ultrasonic welding or the like. It is a preferred objective of the housing to provide rigidity and structural integrity to the portion of the thermometer being held by the user and to provide a water tight container for the various electrical components. The distal end of the housing may be sealed at the joint where the wires to the temperature sensing element exit for water tight operation or the hollow probe may be sealed directly to the housing in a water tight fashion and subsequently sealed at its distal end to complete the water tight envelope around the electrical components, with this latter method being preferred. The rigid polyvinyl chloride used to form the housing and the probe preferably has a hardness of about 65 Shore D durometer. In the preferred embodiment the housing is made of upper and lower housing elements which are joined together with each other and with the hollow probe using ultrasonic welding, a solvent based adhesive suit able for joining polyvinyl chloride elements, or other suitable means. Also, the resilient cover is fixedly held in contact with the housing and hollow probe using solvent based adhesives which are suitable for joining the soft resilient polyvinyl chloride cover to the rigid polyvinyl chloride hollow probe and housing.

The rigid housing, the hollow probe and the resilient cover assembly may be manufactured using an insert molding process. In this process the housing and the probe act as an insert which is placed in a mold cavity, and the material of the cover is injected into the mold cavity to form a soft cover around portions of the probe and the housing.

Electrical components such as thermistors, wires, switches, liquid crystal digital displays and circuit boards containing commercially available or custom chips are readily available. Devices for producing an audible signal are known to one skilled in the art.

The metallic bulb can be made of a wide variety of metallic materials with stainless steel sheet being preferred because of its resistance to corrosion. A wide variety of commercially available epoxy materials are suitable for securing the thermistor within the metallic bulb and securing the metallic bulb to the distal end of the hollow probe and/or soft resilient cover. Epoxies having relatively good thermoconductivity are preferred because they reduce the amount of time necessary to take the temperature measurement. Particles of material having good thermal conductivity and relatively low electrical conductivity such as aluminum oxide may be added to the epoxy to improve response time. The metal bulb may also be secured to the hollow probe and/or resilient cover via mechanical means such as crimping the bulb firmly onto the plastic components.

It can be seen that the instant electronic clinical thermometer provides a simple, straight-forward, reliable, easily fabricated electronic clinical thermometer having improved user friendliness both from the standpoint of the person whose temperature is being taken and the person who is taking the temperature. The instant invention also provides an electronic clinical thermometer which is more resistant to the traumas of usage such as biting, submersion in liquids and shock loads experienced by dropping a thermometer.

What is claimed is:

1. A reusable thermometer for measuring the temperature of a living being comprising:
    a rigid housing having a hollow probe extending outwardly therefrom in a distal direction,
    temperature sensing means located at the distal end of said probe;
    said housing holding display means and electrical means for converting the temperature measured by said temperature sensing means into a read-out on said display means, said electrical means adapted to engage a battery to facilitate operation of said thermometer;
    conductor means for providing electrical communication between said electrical means and said temperature sensing means;
    resilient soft cover means covering said probe and a portion of said housing to form a gripping surface for the user while allowing visualization of said display means by not covering said display means, said resilient cover means being softer than said probe, said resilient cover means and said probe and said housing being fixedly associated; and
    said probe being more flexible in response to bending force than said housing wherein said probe is capable of maintaining its shape while said thermometer is being held by said gripping surface and capable of deflecting in response to forces experienced during oral temperature measurement.

2. The thermometer of claim 1 wherein said temperature sensing means is sealed to said hollow probe and said hollow probe is sealed to said housing to form a water-tight enclosure around said electrical means.

3. The thermometer of claim 1 wherein said display means is a digital display.

4. The thermometer of claim 1 wherein said display means is a liquid crystal display.

5. The thermometer of claim 1 further including manually operable switch means for manually activating said electrical means for temperature measurement and for deactivating said electrical means to preserve the battery while said thermometer is not being used.

6. The thermometer of claim 5 wherein said switch means includes a membrane type switch operable by application of digital force in a direction perpendicular to the surface of said housing.

7. The thermometer of claim 6 further including a transparent flexible plastic sheet sealed to said housing in a water-tight arrangement covering said switch means and said display means.

8. The thermometer of claim 1 further including access means on said housing, said access means capable of being positioned in a first closed position forming a water tight seal with said housing and a second open position allowing access to a battery engaging said electrical means.

9. The thermometer of claim 1 further including a battery in said housing engaging said electrical means.

10. The thermometer of claim 1 wherein said cover means surrounds said housing in at least one plane.

11. The thermometer of claim 1 wherein a portion of said cover means covering said probe has a substantially circularly-shaped cross-section.

12. The thermometer of claim 1 wherein a portion of said cover means covering said probe has an outside diameter within the range of 4 mm to 5 mm.

13. The thermometer of claim 1 wherein a portion of said thermometer, where said cover means covers said probe, has from 50% to 90% of its cross-sectional area comprising said cover means.

14. The thermometer of claim 1 wherein said cover means is made of polyvinyl chloride and said housing is made of polyvinyl chloride, said housing being harder than said cover means.

15. The thermometer of claim 1 wherein said cover means is made of polyvinyl chloride.

16. The thermometer of claim 15 wherein said polyvinyl chloride has a hardness of approximately about 50 Shore A durometer.

17. The thermometer of claim 1 wherein said cover means is made of material selected from the group of natural rubber, synthetic rubber, thermoplastic elastomer, thermoplastics, natural rubber latex, synthetic rubber latex and mixtures of natural rubber latex and synthetic rubber latex.

18. A reusable thermometer comprising:
a housing having a hollow probe extending outwardly therefrom in a distal direction;
temperature sensing means located at the distal end of said probe;
said housing holding display means and electrical means in electrical communication with said temperature sensing means for converting the temperature measured by said temperature sensing means into a read-out on said display, means; and
resilient soft cover means covering said probe and a portion of said housing to form a gripping surface for the user while allowing visualization of said display means by not covering said display means, said resilient cover means being softer than said probe, said resilient cover means and said probe and said housing being fixedly associated.

19. A reusable thermometer for measuring the temperature of a living being comprising:
a rigid housing having a hollow probe extending outwardly therefrom in a distal direction;
temperature sensing means located at the distal end of said probe;
said housing holding digital display means and electrical means for converting the temperature measured by said temperature sensing means into a digital read out on said digital display means, said electrical means adapted to engage a battery to facilitate operation of said thermometer;
conductor means for providing electrical communication between said electrical means and said temperature sensing means;
manually operable switch means for manually activatinq said electrical means for temperature measurement and for deactivating said electrical means to preserve the battery while said thermometer is not being used;
soft resilient cover means covering said probe and a portion of said housing to form a gripping surface for the user while allowing visualization of said display means by not covering said display means, said resilient cover means being softer than said probe, said resilient cover means surrounding said housing in at least one plane; and
said probe being more flexible in response to bending forces than said housing wherein said probe is capable of maintaining its shape while said thermometer is being held by said gripping surface and capable of deflecting in response to forces experienced during oral temperature measurement.

20. The thermometer of claim 19 wherein said temperature sensing means is sealed to said hollow probe and said hollow probe is sealed to said housing to form a water tight enclosure around said electrical means.

21. The thermometer of claim 19 further including a transparent flexible plastic sheet sealed to said housing in a water tight arrangement covering said switch means and said display means.

22. The thermometer of claim 19 further including access means on said housing, said access means capable of being positioned in a first closed position forming a water tight seal with said housing and a second open position allowing access to the battery engaging said electrical means.

23. The thermometer of claim 19 wherein said cover means is made of polyvinyl chloride and said housing is made of polyvinyl chloride, said housing being harder than said cover means.

24. The thermometer of claim 19 wherein said cover means is made of polyvinyl chloride having a hardness of approximately about 50 Shore A durometer.

* * * * *